US010252662B2

(12) United States Patent
Hoffmann (10) Patent No.: US 10,252,662 B2
(45) Date of Patent: Apr. 9, 2019

(54) METHOD FOR CONTROLLING A HEADLIGHT

(71) Applicant: HELLA KGaA Hueck & Co., Lippstadt (DE)

(72) Inventor: Ingo Hoffmann, Berlin (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 0 days.

(21) Appl. No.: 15/648,874

(22) Filed: Jul. 13, 2017

(65) Prior Publication Data

US 2017/0305329 A1    Oct. 26, 2017

Related U.S. Application Data

(63) Continuation of application No. 15/227,010, filed on Aug. 3, 2016, now Pat. No. 9,738,215.

(30) Foreign Application Priority Data

Aug. 3, 2015   (DE) .................. 10 2015 214 760

(51) Int. Cl.
*B60Q 1/02*   (2006.01)
*B60Q 1/14*   (2006.01)

(52) U.S. Cl.
CPC ........ *B60Q 1/143* (2013.01); *B60Q 2300/056* (2013.01); *B60Q 2300/42* (2013.01); *B60Q 2300/45* (2013.01)

(58) Field of Classification Search
None
See application file for complete search history.

(56) References Cited

U.S. PATENT DOCUMENTS

| 5,837,994 A | 11/1998 | Stam et al. |
|---|---|---|
| 6,906,467 B2 | 6/2005 | Stam et al. |
| 7,565,006 B2 * | 7/2009 | Stam ............... B60Q 1/085 315/82 |
| 9,738,215 B2 * | 8/2017 | Hoffmann ............ B60Q 1/143 |
| 2009/0073258 A1 | 3/2009 | Robert et al. |

(Continued)

OTHER PUBLICATIONS

German Search Report, Application No. DE 10 2015 214 760.6, dated Apr. 21, 2016, 7 pgs.

(Continued)

*Primary Examiner* — Anh Q Tran
(74) *Attorney, Agent, or Firm* — Paul D. Strain, Esq.; Strain & Strain PLLC (57) ABSTRACT

The invention relates to a method for controlling a light distribution of a headlight, in particular of a headlight comprising one illuminant or comprising a plurality of illuminants which generates or generate an adaptable light distribution, wherein a glare region of the light distribution is defined with a glare distance outside which no causing of glare for a road user is effected, wherein an optical monitoring device having a monitoring region having a monitoring boundary is provided, wherein a luminous object is identifiable as a road user only within the monitoring region, wherein upon recognition or supposition of at least one luminous object which is outside the monitoring region but within the glare region, the at least one headlight is driven such that the glare distance is adapted, such as in particular reduced.

4 Claims, 7 Drawing Sheets

(56) References Cited

U.S. PATENT DOCUMENTS

| | | |
|---|---|---|
| 2012/0206043 A1 | 8/2012 | Yamazaki et al. |
| 2015/0048738 A1* | 2/2015 | Falb .................. G06K 9/00825 315/82 |
| 2017/0036592 A1 | 2/2017 | Hoffmann |

OTHER PUBLICATIONS

Hoffmann; U.S. PTO Notice of Allowance, U.S. Appl. No. 15/227,010, dated Apr. 13, 2017, 10 pgs.

* cited by examiner

METHOD FOR CONTROLLING A HEADLIGHT

CROSS-REFERENCE TO RELATED PATENT APPLICATIONS

This application is a Continuation of U.S. application Ser. No. 15/227,010, filed Aug. 3, 2016, which is based upon and claims the benefit of priority from prior German Patent Application No. 10 2015 214 760.6, filed Aug. 3, 2015, the entire contents of all of which are incorporated herein by reference in their entirety.

TECHNICAL FIELD

The invention relates to a method for controlling a headlight, in particular for controlling one headlight or two headlights or headlight systems of a motor vehicle.

PRIOR ART

Modern headlights for motor vehicles are becoming better and better, that is to say that the light intensity of the headlights is increasing more and more. This has the effect that the maximum range of the light distribution is increasing further and further and the intensity distribution can thus also extend further and further in front of the motor vehicle, which also causes the maximum glare distance of the headlight to increase. In this case, the glare distance is the distance whose limit indicates where the undershooting occurs of an intensity threshold value for which an unreasonable glare effect on other road users no longer takes place. If an object is situated nearer to the headlight than the glare distance, then an unreasonable glare effect would possibly occur. At a distance that is further than the glare distance, a glare effect would possibly occur, but it may be regarded as reasonable. The glare distance is dependent here on the angle of the object with respect to the headlight.

The increase in the maximum range means that in modern headlights there may be the risk of glare even at a relatively great distance from the motor vehicle if another road user were situated within the glare distance of the headlight. In the prior art, optical monitoring devices are known which can monitor a monitoring region in front of the motor vehicle, such that other, in particular oncoming, road users in the monitoring region can be recognized and identified and their distance or position with respect to the own motor vehicle can be determined. In this regard, the light distribution of the headlight can be controlled depending on the other road users recognized, in order not to subject them to glare, that is to say to suppress glare for them.

However, the modern headlights in the meantime have attained a range that is significantly greater than the range of the monitoring region of a conventional monitoring device in the prior art. As a result, in particular oncoming road users may be subjected to glare far earlier than they can be identified as road users by the optical monitoring devices available today.

U.S. Pat. No. 5,837,994 discloses an automatically controllable vehicle headlight wherein an optical monitoring device recognizes front lights or rear lights and can differentiate them, such that other motor vehicles can be recognized, and the headlight is controlled in such a way that the high beam is controlled as a function of the distance and the horizontal orientation relative to the own motor vehicle. In this case, it thus becomes clear that the monitoring device can identify the lights of other road users as such in the monitoring region and can thus also identify the other road users as such. This also means that the range of the headlight and in particular the glare distance thereof correspond to or even undershoot the range of the monitoring region, as already explained above. Modern headlights, by contrast, have a far higher range and glare distance in comparison therewith, such that this recognition of the road users for whom glare is to be suppressed cannot be carried out.

SUMMARY OF THE INVENTION, PROBLEM, SOLUTION, ADVANTAGES

Therefore, the problem addressed by the invention is that of providing a method for controlling a headlight which can be carried out in a simple manner but nevertheless allows reliable suppression of glare for oncoming road users. Moreover, the intention is to provide a motor vehicle for carrying out such a method.

The problem addressed by the invention concerning the method is solved by the features of Claim 1.

One exemplary embodiment of the invention relates to a method for controlling a light distribution of a headlight, in particular of a headlight comprising one illuminant or comprising a plurality of illuminants which generates or generate an adaptable light distribution, wherein a glare region of the light distribution is defined with a glare distance outside which no causing of glare for a road user is effected, wherein an optical monitoring device having a monitoring region having a delimited monitoring range or having a monitoring boundary is provided, wherein a luminous object is identifiable as a road user only within the monitoring region, wherein upon recognition or supposition of at least one luminous object which is outside the monitoring region but within the glare region, the at least one headlight is driven such that the glare distance is adapted, such as in particular reduced. What is achieved as a result is that upon recognition of at least one object outside the monitoring region glare is intended to be adapted or reduced or even avoided. This provides for improved safety for road users at risk of glare in particular even with the use of modern headlights.

In the case of a headlight comprising a plurality of illuminants, this may involve illuminants that are integrated into a housing, or illuminants that each have a dedicated housing. A headlight is optionally characterized in that the light distributions of the individual illuminants are superimposed to form a total light distribution. A road user is furthermore taken to mean an object at risk of glare, in particular a motor vehicle comprising at least one self-luminous element that is controlled by a road user. This may advantageously involve a motor vehicle, in particular an oncoming motor vehicle comprising two visible, self-luminous front headlights. The object may likewise be an oncoming two-wheeler comprising one visible luminous element, that is to say one headlight.

It is advantageous here if the delimited monitoring range or the monitoring boundary is determined such that other, in particular oncoming, road users in the monitoring region can be recognized and identified and their distance or position with respect to the own motor vehicle can be determined. It is particularly advantageous here if other, in particular oncoming, road users, by the time they enter the monitoring region, can be reliably recognized and identified and their distance or position with respect to the own motor vehicle can be determined.

It is thus advantageous here if the monitoring boundary of the monitoring region is determined by determining the visual range of the camera and subtracting therefrom the distance covered by the object until it is identifiable as a road user. Here the visual range of the camera is the distance at which a luminous object can be recognized. The distance covered until identification as a road user is determined here depending on the relative speed of the object and depending on the recognition time required at the distance.

Therefore, it is advantageous if the monitoring boundary of the monitoring region is determined depending on at least one of the following conditions: visibility conditions, weather conditions, maximum permissible speed, in particular from the section being driven along at this point in time, current speed of the motor vehicle and/or object and the course of the section of roadway.

Furthermore, it is advantageous if the glare region is the maximum glare region of the headlight, and if the glare distance designates the current glare distance of the headlight.

It is particularly advantageous if the glare distance is reduced if the glare region is set to be larger than the monitoring region, in particular if the glare region corresponds to the maximum glare region.

Moreover, it is expedient if the glare distance remains unchanged or is increased if the glare region is set to be smaller than the monitoring region or in a manner corresponding to the monitoring region. Moreover, it is advantageous if the adaptation, such as in particular the reduction, of the glare distance of the at least one headlight is effected on the basis of a residence probability of the object or of the luminous object. In this case, the residence probability is determined for the object, and a lower limit for the distance of the object is determined therefrom in order to be able to expediently reduce the glare distance or set it to a reduced value.

It is therefore advantageous here if the glare distance is reduced to the lower limit of the distance of the object for which the glare distance is reduced on the basis of the residence probability.

Furthermore, it is advantageous if the glare distance is reduced on the basis of a residence probability of the object or of the luminous object in such a way that the glare distance is in particular precisely within the monitoring region. It can be ensured in this way that an object outside the monitoring region cannot be subjected to glare by the headlight.

It is particularly advantageous here if for reducing the glare region and/or the glare distance, the intensity of the light of the headlight is reduced. A simple driving of the headlight or of at least one of its illuminants can be performed as a result.

Moreover, it is expedient if the intensity of the light of the headlight is reduced in a predefined areal or spatial region, such that the glare distance is reduced in a predefined areal or spatial region, in particular in front of a motor vehicle. As a result, local suppressions of glare can be performed, wherein no suppression of glare is performed in other areal or spatial regions. The suppression of glare performed may be configured dynamically with respect to time here in order, if appropriate, to comply with a moving object and to suppress glare for the latter. It is advantageous here if the areal or spatial region for which glare is suppressed corresponds to that in which a residence probability higher than a predefined threshold value is present.

It is also advantageous here if the residence probability of the object or of the luminous object outside the monitoring region and within the glare region is determined. A probability of an object or a luminous object being situated outside the monitoring region and within the glare region is thus determined. As a result, the location of the object is estimated, such that the suppression of glare can be performed on the basis of this residence probability determined, if it is assumed that glare is to be suppressed for the object. Furthermore, it is advantageous, particularly with a reduced glare distance, to determine the probability of whether an object is situated outside the monitoring region, but within the maximum glare region.

Moreover, it is advantageous if the residence probability of the object or of the luminous object is determined on the basis of the data of the monitoring device. In this case, on account of the light intensity or the pattern on the basis of available background data of different types of headlight, an object can be assumed which could generate a corresponding image, such as the image recorded by the monitoring device.

Moreover, it is advantageous if the residence probability of the object or of the luminous object is composed of the probability of the object or of the luminous object being an object at risk of glare and/or the probability of the object at risk of glare being situated in the glare region of the headlight and/or the probability of an object being present. Alternatively or additionally, the residence probability is composed of the probability of the object or the luminous object being an object at risk of glare and/or the probability of the object at risk of glare being situated in the illumination region of the headlight, wherein the illumination region is composed of the monitoring region, the glare region and a region in front of the glare region in which no glare takes place. Object at risk of glare is advantageously taken to mean another road user, in particular another road user controlling a motor vehicle comprising at least one headlight. The glare region or the illumination region is taken to mean in particular the maximum glare region or illumination region of the headlight. In one advantageous development, the current glare region or illumination region can be used. It is advantageous here to carry out the method only if the current glare region of the headlight exceeds the current monitoring region of the monitoring device. Otherwise a conventional method is intended to be used.

Moreover, in one exemplary embodiment it is advantageous if during the reduction of the intensity of the light of the headlight, the intensity profile of the light of the object is used for classifying the luminous object. As a result, it is possible to differentiate whether the object is a self-luminous object or an irradiated object. The self-luminous object does not change its intensity profile, while the irradiated object also varies its intensity profile. An irradiated object is taken to mean in particular an object which becomes a luminous object only by means of irradiation by another light source. In particular, this is taken to mean an object having a surface which reflects the light in a wavelength range identical or at least similar to the incident wavelength range, in particular an object having at least one reflector. It is advantageous here if the fact of whether the object is a self-luminous object or an irradiated object is used for identifying an object as a road user.

Furthermore, it is advantageous if the object is classified on the basis of a temporal pattern generated by the headlight. In this case, in addition to the first dimming, the headlight advantageously performs further dimmings which are preferably effected successively in a predefined temporal sequence. It is furthermore advantageous if these temporal sequences are created randomly and made available for the classification. It is furthermore advantageous if the further dimmings are effected such that they are not perceived by the driver. This may be done in such a way that the plurality of dimmings are carried out one after another very rapidly in time and/or that these dimmings are effected within a very small intensity range. As a result, the intensity variation observed with the aid of the monitoring unit at the object to be classified can be associated unambiguously with the headlight and a self-luminous object can be ruled out even more reliably.

Moreover, it is advantageous if the glare region of the headlight is divided into a safe zone and into a comfort zone, wherein no damage to the eye and no serious visual restrictions are present in the safe zone and no glare effect is present in the comfort zone. As a result, the object can be irradiated in such a way that it is either in the safe zone or in the comfort zone if it passes into the glare region. No glare effect means that only a reasonable glare effect for another road user is generated in the eye.

Moreover, it is advantageous if the reduction of the glare region in the case of residence probabilities below a threshold value is effected in such a way that the object is situated at least in the safe zone. The reduction here means the reduction of the glare distance.

It is particularly advantageous if the reduction given the presence of a residence probability above a threshold value is effected in such a way that the object is situated at least in the comfort zone. In this regard, a location assumed to be probable is extracted from the residence probability for the object, said location being taken into account in the control.

In this regard, it is also advantageous if in the case of an unsafe distance determination for the object, the glare region of the headlight is reduced in such a way that all objects are situated at least in a safe zone.

Moreover, it is advantageous if the light intensity is reduced in a region having increased brightness compared with the surrounding distribution. As a result, the reduction is perceived less distinctly by the driver and a disturbance of the driver can be reduced or even avoided.

Moreover, it is advantageous if the reduction of the light intensity is achieved by reducing or switching off superimposing light sources or light distributions which are used for generating a matrix high beam and/or which lie in the region in which at least one additional spotlight or additional spotlights is or are superimposed on the matrix high beam and/or lies or lie in a region centrally with respect to the matrix high beam. In this regard, the luminous distance or the glare distance is reduced by the light intensity of specific selected illuminants being reduced in a targeted manner.

Moreover, it is advantageous if an object is regarded as not classifiable or as not identifiable as a road user if the classification method yields no result or yields no result with sufficient quality or yields no result in a predefined time period or the classification method yields no result by the time a predefined distance of the object is undershot, or if a method for preclassification yields no result or yields no result with sufficiently good quality. If no classification is present, it is advantageous if the object is regarded as an object for which glare is to be suppressed. Increased safety is generated as a result. An object can be identified as a road user if it is classifiable. A result of sufficiently good quality is present if the classification quality and/or the probability of the classification being correct exceed(s) a predefined threshold value. In particular, an object can be identified as a road user if it is classifiable until reaching a predefined minimum distance. A result of sufficiently good quality is therefore present if the classification quality and/or the probability of the classification being correct attain(s) a predefined threshold value until reaching a predefined distance of the object from the headlight or the motor vehicle.

Moreover, it is advantageous if the glare region or the illumination region is extended if the probability of an object at risk of glare being situated outside the monitoring region decreases or becomes zero or falls below a threshold value. In this regard, the glare distance is increased again if no object is situated in the glare region with meaningful residence probability and, correspondingly, very probably no glare is effected. In particular, this is possible if a classification was able to be improved on the basis of the observation of the intensity profile, such that a classification result with sufficiently good quality can be generated. In this way, an object can be classified reliably as even before entering the monitoring region.

It is particularly advantageous here if the reduction of the light distribution is reversed by the superimposing light distribution being switched on again, in particular switched on in a stepwise manner. The reversal can be effected slowly here, in particular more slowly than the performance of the reduction itself.

Moreover, it is advantageous if the glare region or the illumination zone is reduced given the presence of a glare probability, wherein the glare region or the illumination zone is reduced or shortened when objects are present outside the classification range, and/or the glare region or the illumination zone is reduced or shortened when non-classifiable objects are present, and/or the glare region or the illumination zone is reduced or shortened when non-visible regions are detected.

The problem is also solved by a method for controlling a light distribution of a headlight, in particular of a headlight comprising one illuminant or comprising a plurality of illuminants which generates or generate an adaptable light distribution, wherein a glare region of the light distribution is defined with a glare distance outside which no causing of glare for a road user is effected, wherein an optical monitoring device having a monitoring region having a monitoring boundary is provided, wherein an object is identifiable as a road user only within the monitoring region, wherein upon recognition of an object which might be a road user or upon supposition of a road user, which object or which road user is outside the monitoring region but within the glare region, the at least one headlight is driven such that the glare distance is reduced.

It is also advantageous here if the residence probability of a recognized object and/or of a supposed road user outside the monitoring region and within the glare region is determined.

A road user here is taken to mean an object at risk of glare, in particular a motor vehicle controlled by a road user. This may advantageously involve a motor vehicle, in particular an oncoming motor vehicle. The object may likewise be an oncoming two-wheeler or an oncoming pedestrian. Oncoming two-wheelers and/or pedestrians are advantageously recognized here on the basis of at least one vehicle sensor system, in particular on the basis of lidar, radar or infrared beams or on the basis of vehicle-to-two-wheeler/pedestrian communication systems.

It is thus advantageous here if the monitoring boundary of the monitoring region is determined by determining the visual range of the vehicle sensor system used and subtracting therefrom the distance covered by the object until it is identifiable as a road user. Here the visual range of the vehicle sensor system used is the distance at which an object can be recognized. The distance covered until identification as a road user is determined here depending on the relative speed of the object and depending on the recognition time required at the distance. The problem addressed concerning the motor vehicle is solved by the features of Claim 24.

One exemplary embodiment relates to a motor vehicle comprising at least one headlight, advantageously comprising two headlights, and comprising an optical monitoring device for carrying out a method according to the invention.

Further advantageous configurations are described by the following description of the figures and by the dependent claims.

BRIEF DESCRIPTION OF THE DRAWINGS

The invention is explained in greater detail below on the basis of at least one exemplary embodiment with reference to the figures of the drawing, in which.

PREFERRED EMBODIMENT OF THE INVENTION

Figure 1:
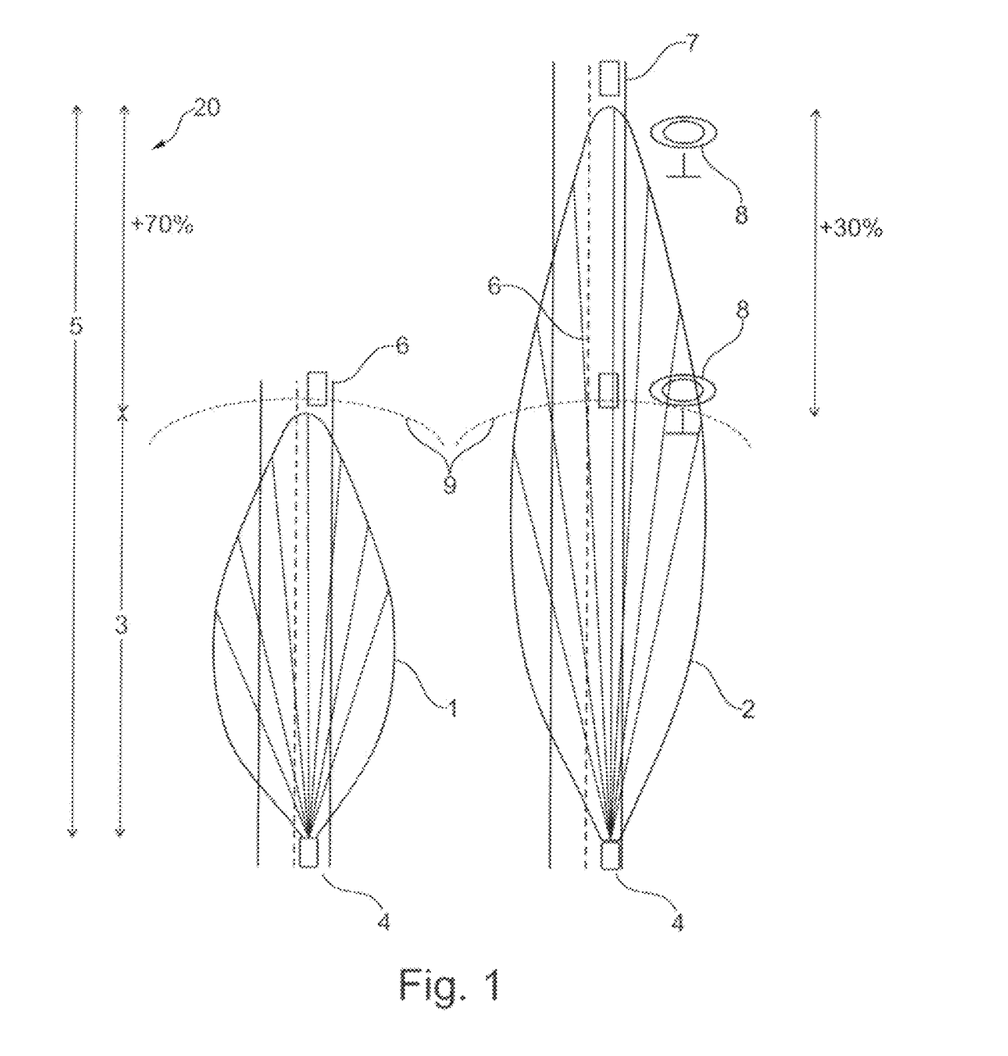
FIG. 1 shows a schematic illustration of a motor vehicle comprising at least one headlight having a first and a second light distribution.

FIG. 1 shows in a schematic illustration a first light distribution 1 of a headlight according to the prior art, see left, and a second light distribution 2 of a high beam of modern headlights, see right.

It is evident that the first light distribution 1 has a significantly less expansive range and the glare distance 3 constitutes a known distance. In this case, the headlight according to the prior art under consideration is mounted for example on the motor vehicle 4. In this case, for controlling the headlight, the motor vehicle 4 comprises an optical monitoring device, the monitoring region of which substantially has the range of the glare distance 3 of the headlight, such that the region in front of the motor vehicle 4 that is monitored for other road users covers the region at risk of glare from the headlight. Another road user can therefore be discovered and identified as such before being subjected to glare, and in such a case the headlight can be controlled in such a way that glare is suppressed for the other road user.

With the higher illuminances of the modern headlights, by contrast, significantly greater ranges and thus also greater glare distances 5 can be achieved, as revealed by the light distribution 2 of a modern headlight. Another, for example oncoming, road user 6 not yet subjected to glare in the case of a headlight according to the prior art is now subjected to glare with the use of modern headlights on account of the higher glare distance 5. Since other road users 7 at a greater distance may also already be subjected to glare, this necessitates a significantly higher observation distance of an optical monitoring device at which a luminous object is identifiable as a road user, that is to say that a distinction can be made between the monitored object as another road user for whom glare is to be suppressed and an object for which glare does not have to be suppressed. This is relevant because otherwise a suppression of glare would take place for other luminous objects as well, which would be undesirable, however. This is because for example irradiated, that is to say reflective, objects, such as in particular retroreflective elements on reflector posts, are often employed in proximity to roads and are in the main difficult to differentiate from objects for which glare is to be suppressed. Non-differentiation would either cause the headlight to repeatedly switch to high beam and low beam in an unjustified manner or, as a result of excessively long dimming, make it impossible to use the great luminous distance for better vision. In this regard, for example, traffic signs or retroreflective objects, that is to say reflectors or the like, may be illuminated, which are then recognizable as luminous objects even at relatively great distances from the own motor vehicle, wherein it is not possible to recognize whether this involves another road user or non-relevant other objects. Such other objects are illustrated as traffic signs 8, for example, in FIG. 1.

Therefore, if the glare distance 5 of the modern headlights increases significantly, such as by +70%, for example, even non-relevant objects, such as traffic signs, for example, even at significantly greater distances, such as by 30% or more, for example, may be recognizable as luminous objects. In particular, this is the case if a retroreflective object is illuminated by a light source such as, in particular, the headlight of the motor vehicle 4 with high intensity and is thus manifested as a bright object to the optical monitoring device.

However, since the optical monitoring devices cannot accomplish discriminative recognition at the greater distances, the risk of incorrect decisions in the control of the suppression of glare increases.

The method according to the invention for controlling a light distribution of a headlight provides for the headlight to comprise at least one illuminant or a plurality of illuminants which can be driven. The illuminant or the illuminants generate(s) an adaptable light distribution, wherein a glare region of the light distribution is defined with a glare distance 5 outside which no causing of glare for a road user is effected, wherein an optical monitoring device having a monitoring region 9, in particular having a monitoring boundary or having a delimited monitoring range is provided, wherein a luminous object is identifiable as a road user only within the monitoring region. In this case, upon recognition or supposition of a luminous object 7, 8 which is outside the monitoring region but within the glare region, the at least one headlight is driven, such that the glare distance is reduced and the glare is reduced or glare is suppressed for the object.

In this case, the glare distance 5 of the at least one headlight is reduced on the basis of a residence probability of the luminous object 7, 8.

In this case, the monitoring region of the monitoring device is described or defined for example in this way: the monitoring region is a zone in which road users, that is to say objects, at risk of glare can be recognized and classified with high reliability and their distance can be downwardly delimited. In this case, the monitoring region is also advantageously a zone in which road users, that is to say objects, at risk of glare, by the time they enter said zone, can be recognized and classified with high reliability and their distance can be downwardly delimited. For this purpose, it is therefore necessary to be able already to recognize the object beforehand and to classify it with high reliability even at high speed within a time period dependent thereon. By way of example, a classification and/or detection means of the vehicle sensor system is used for determining the object. On the basis of the classification result, the distance of the object is then determined and/or downwardly delimited. The zone can be preset or detected and/or updated on the basis of the determination of situation-dependent classification probabilities and probabilities for the position and/or distance of an object in the surroundings. In this case, the surroundings, in particular the course of the roadway being driven along, such as a horizontal and/or vertical curvature, can be determined and taken into account. Furthermore, visibility and weather conditions can affect the size of the zone and can be concomitantly used implicitly or explicitly for the determination.

Outside the monitoring region of the monitoring device, although an object may possibly still be recognized as a luminous object, it is not possible to identify it with certainty as a road user. In particular, it is not possible to do this with certainty before the object enters the monitoring region. However, in order not to endanger the other road user by glare, a decision about suppression of glare must be taken, however, actually before entry into the glare region or within a predefined time period. For this purpose, a residence probability is determined for each recognized luminous object, the headlight being driven depending on said residence probability.

In addition, other sensor data, such as, in particular, radio data, or other car-to-X data or statistical data, for example from a memory, can be used for determining the residence probability. This is also possible as an alternative to the monitoring device if, outside the monitoring region of the monitoring device, another road user cannot be recognized as a luminous object. This may be the case for example on account of a present vertical and/or horizontal curvature of the course of the roadway being driven along. This is because the monitoring region has maximally a monitoring boundary of the visual range of the camera minus the distance covered by the object in the recognition time.

In this case, the residence probability is described or defined in this way: the residence probability is a probability of an object being situated outside the monitoring region but within the glare region. The residence probability is determined on the basis of the sensor data and is composed, for example, of the probability of an object at risk of glare being involved and/or the probability of the object at risk of glare being situated in the glare region or in the illumination region of the headlight and/or the probability of an object at risk of glare being present.

In this case, particularly upon the recognition of a luminous object, the probability of the latter being situated within the glare region can be determined under the assumption that said object is a road user, that is to say an object at risk of glare. An algorithm can be used for this calculation, which algorithm is also used for the determination and/or lower limitation of the distance of a luminous object identified with high certainty as a road user. In the case where the object is not a road user, this distance determination would not yield a correct result. Therefore, the probability of the recognized object being a road user is to be concomitantly used in the determination of the residence probability. It is advantageous here to carry out a distance determination under the assumption that the luminous object is a road user for every image or for every n-th image as soon as the luminous object is recognized. As a result, the time period until the first decision can be made dependent on when an object would enter the glare region with a residence probability. Even in the case where no luminous object is recognizable, it is possible to determine a probability of an object being situated outside the monitoring region of the monitoring unit, but in the glare region of the headlight. This is advantageous particularly if the visual range of the monitoring device is so low that it is smaller than the glare region of the headlight or corresponds thereto. It is therefore additionally advantageous if the residence probability outside, but near, the glare region of the headlight is also determined.

In this case, the glare region and the glare distance are described or defined in this way: the glare region is the region in which glare can be effected, wherein the boundary of the glare region corresponds to the glare distance in the respective emission direction. In this case, the glare region and the glare distance can be determined depending on the current driving of the headlight, that is to say on the current light distribution of the headlight. In this case, the glare distance is the maximum distance at which a glare intensity is generated in the eye of another road user, in particular of an oncoming motor vehicle or motor vehicle travelling ahead. Outside the glare region, that is to say behind the glare distance, is therefore where the intensity is below a glare or threshold value.

The glare region can also be defined by way of the glare perception: the glare perception is significantly reduced outside the glare region in comparison with the glare region.

In this case, the glare intensity is described or defined in this way: the glare intensity is a threshold value below which a reasonable glare effect for another road user is generated in the eye. The glare effect, that is to say a glare perception, here is highly individual, however, and is dependent both on the surroundings and on the person, in particular on age.

It is possible to define a threshold value for the glare intensity, wherein this can be carried out even without the individuality. In this case, the glare effect increases continuously as the intensity increases. When a slight glare effect is still acceptable, starting from a higher intensity it is perceived as significantly disturbing. This is manifested for example in squinting. If the intensity is increased further beyond that, this leads to measurable restrictions of vision and, particularly when lasers are used, may possibly even lead to permanent damage in the eye. In the case of a measurable restriction of vision, the visual function, particularly in direct proximity to the glare source, is restricted by the blurring effect. This effect can be measured, depending on the intensity of the glare source, in a specific scene by means of the equivalent blur luminance. In this case, for the scene without a glare source the blurring effect of the eye is simulated and the visibility of adjacent objects, that is to say objects situated in the blur circle, is compared with a visibility given the presence of a glare source with a specific intensity. In this way, the threshold value for the restrictions of vision can be detected at least statistically. For this purpose, it suffices if the threshold value is defined at least such that no restrictions of vision arise for a healthy driver, Other experts are of the opinion that no driver, regardless of age, should be expected to put up with a disturbing glare effect. Where this threshold value is correspondingly defined depends here on various factors that take account of, for example, legislation or the value presettings of the automobile manufacturer. A rather defensive threshold value may be assumed for example with a value of 0.05 lux.

The reduction of the glare distance 5 of the at least one headlight leads to a reduction of the glare region. This is effected for example by a targeted reduction of the intensity of the light of the headlight. Alternatively or additionally, the angle of the at least one headlight element can be altered.

It is particularly advantageous here if this reduction is effected spatially inhomogeneously and a corresponding suppression of glare can be effected.

Figure 2:
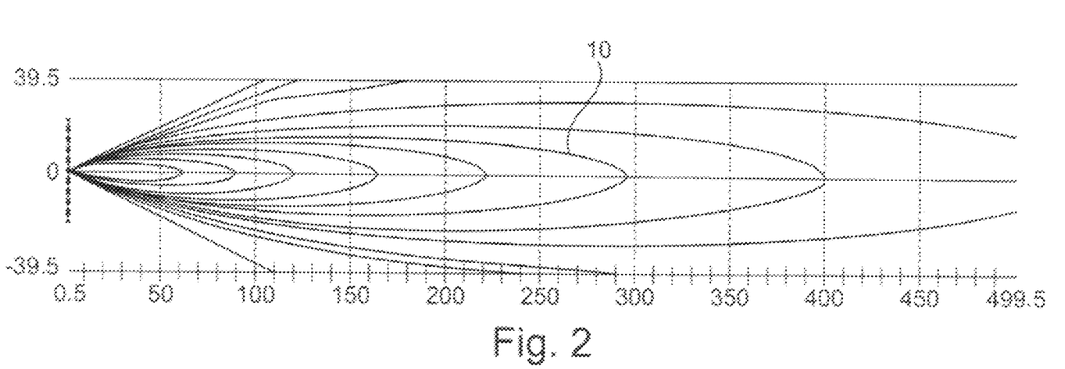
FIG. 2 shows a schematic illustration of a light distribution of a conventional headlight with high beam.
Figure 3:
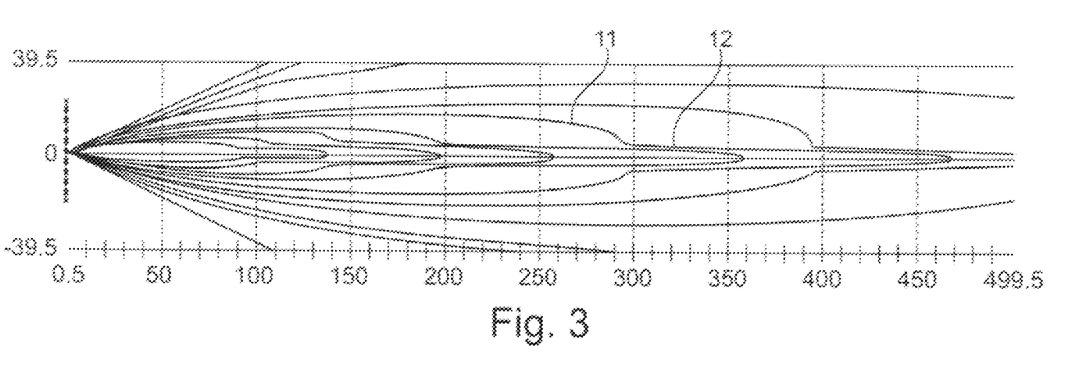
FIG. 3 shows a schematic illustration of a light distribution of a modern headlight having high beam and having a high-intensity beam.

FIGS. 2 and 3 show in this respect a light distribution 10, 11 of a motor vehicle comprising, for example, two headlights. The light distribution 10 represents an intensity distribution on an area or in the space in front of the motor vehicle, wherein only a high-beam light distribution is discernible. The light distribution 11 represents an intensity distribution on an area or in the space in front of the motor vehicle, wherein a high-intensity beam (high-intensity spot) was added to the high-beam light distribution, such that the high-beam light distribution 10 was supplemented by an almost needlelike intensity extension 12.

The intensity of the light of the headlight can be reduced in a predefined areal or spatial region, such that the glare distance is reduced in a predefined areal or spatial region, in particular in front of a motor vehicle. In this case, for example, the high-beam light distribution or else the high-intensity beam can be reduced in order to reduce the sum of both light intensities.

In accordance with the method according to the invention, the residence probability of the luminous object 7, 8 outside the monitoring region 9 and within the glare region 20 is determined. In this case, the residence probability of the luminous object 7, 8 is determined on the basis of the data of the monitoring device or additionally or alternatively of the other sensor system and/or memory data. On the basis of the data, in particular image data, an evaluation can be carried out which has the effect that the object can be estimated. If a certain type of object is present for example with a specific probability, then on the basis of the image data its distance can be estimated and the residence probability can be estimated.

It is advantageous here if the residence probability of the luminous object is composed of the probability of the luminous object being an object at risk of glare and/or the probability of the object at risk of glare being situated in the glare region of the headlight and/or the probability of an object being present.

The residence probability is determined on the basis of the image data of the monitoring device. In this case, a plurality of images are taken into consideration. It is advantageous here to begin with the determination of the residence probability as soon as a luminous object can be recognized. This is possible particularly in the illumination region of the headlight, wherein the illumination region is composed of the monitoring region, the glare region and a region in front of the glare region in which no glare takes place. By the time the object enters the glare region, that is to say for example after a predefined time period has elapsed, a first decision must be taken, which affects the driving of the headlight. Afterward, the object is tracked further in the image data and, if necessary, a second decision is taken, which affects the driving of the headlight. It is advantageous here to associate the type of driving of the headlight with the variation in the image. In order to be able to better assess the object, therefore, in particular advantageously during the reduction of the glare region, that is to say in particular during the reduction of the intensity of the light of the headlight, the intensity profile of the light of the object is used for classifying the object. In this case, the reduction of the intensity of the light can be carried out in such a way that it is at least virtually not recognized by the human eye.

Figure 4:
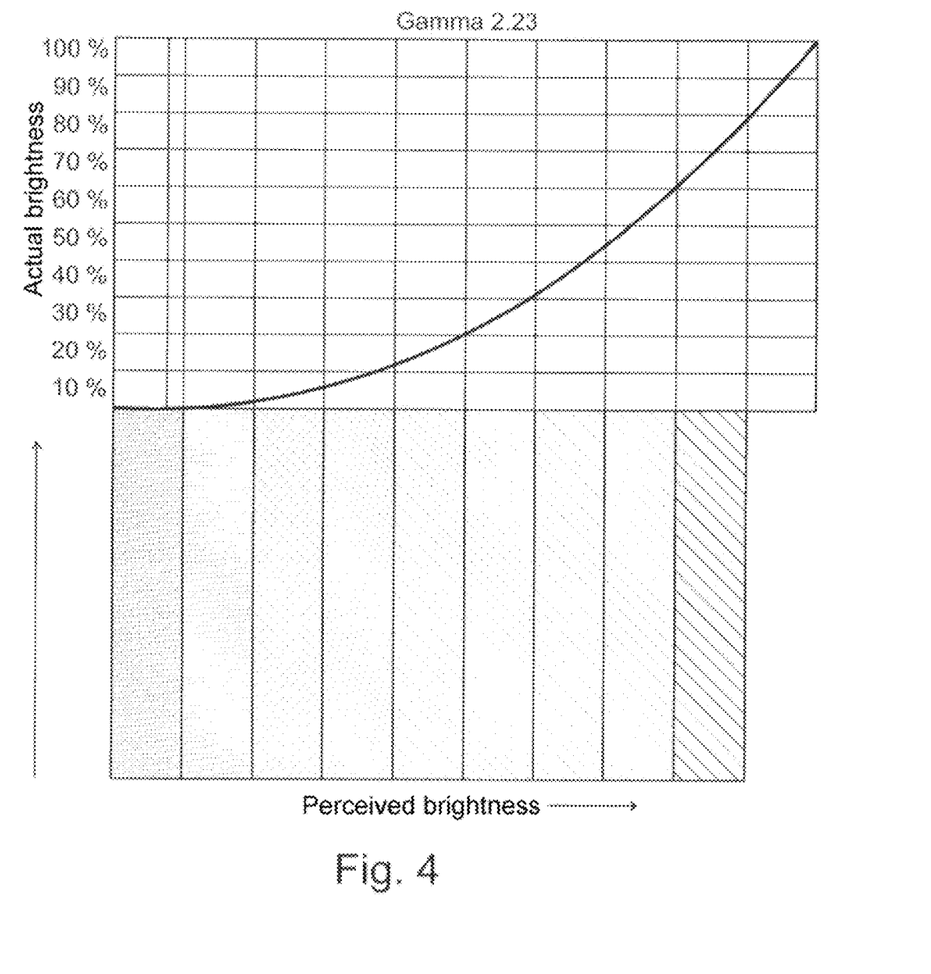
FIG. 4 shows a schematic illustration of a brightness distribution.

In this case, FIG. 4 shows the actual brightness profile, top in FIG. 4, and the brightness perceived by the human eye, bottom in FIG. 4. In this case, the intensity of the reduction can be minimized in such a way that it is not perceptible or is at least scarcely still perceptible to the eye. This exploits the fact that the eye perceives brightness differences logarithmically. The brightness therefore has to be altered exponentially in order to bring about an optically uniform variation impression. In contrast thereto, the light intensity decreases only in proportion to the square of the distance, such that an unnoticed reduction of the light already makes it possible to achieve a suppression of glare for other road users. It is advantageous here if a suppression of glare is effected in the direct surroundings of a luminous object, since the perception of the eye in said surroundings, in a manner similar to that in the case of glare, is restricted by the so-called blur luminance. As a result, the change in brightness is perceived even less in the darker region directly around a luminous object compared with other regions. On account of this fact, the reduced perceptibility is reinforced again in addition to the effect of the logarithmic brightness perception of the eye.

Figure 5:
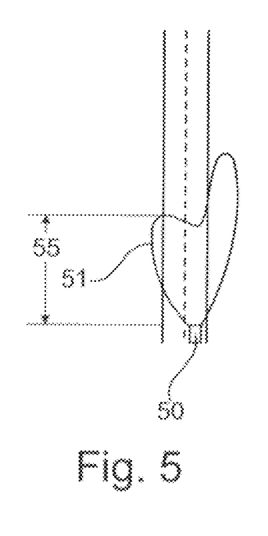
FIG. 5 shows a schematic illustration of a light distribution of a low beam.
Figure 6:
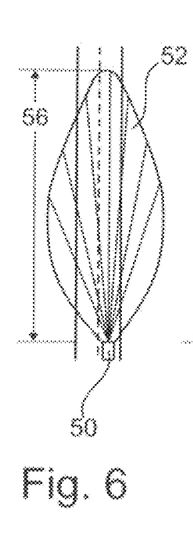
FIG. 6 shows a schematic illustration of a light distribution of a high beam.
Figure 7:
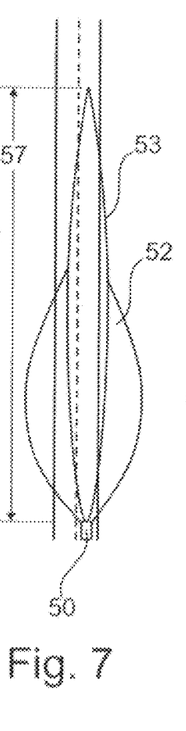
FIG. 7 shows a schematic illustration of a light distribution of a high-intensity beam.
Figure 8:
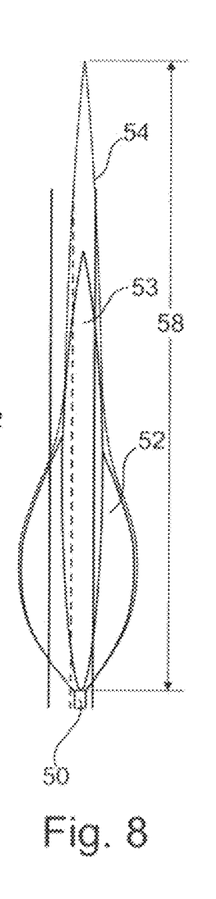
FIG. 8 shows a schematic illustration of a light distribution of a high beam with high-intensity beam.

FIGS. 5 to 8 show various light distributions of a motor vehicle 50. FIG. 5 shows a low-beam light distribution 51 in the region of the roadway. The light distribution has a small spatial extent and causes no glare for oncoming traffic. The glare distance 55 is small relative to the spatial extent of the light distribution in the case of the low beam by virtue of the fact that the light beam is directed downward toward the road. FIG. 6 shows a high-beam light distribution 52 in the region of the roadway. This light distribution is generated by a matrix headlight, for example. The light distribution already has a greater spatial extent and thus a glare distance 56. FIG. 7 shows a high-beam light distribution 52 in the region of the roadway and a high-intensity beam 53. The latter is generated by a laser-based headlight illuminant, for example. The light distribution of the in particular laser-based high-intensity beam 53 alone, that is to say with the high-beam light distribution 52 switched off, has an even greater spatial extent and thus an even greater glare distance 57. FIG. 8 shows the superimposition of the light distribution of the high beam 52 and of the high-intensity beam 53 to form a resulting light distribution 54 having an even greater glare distance 58.

In this case, the glare region of the headlight can be divided for example into a safe zone and into a comfort zone, wherein no damage to the eye and no serious visual restrictions are present in the safe zone and no glare effect is present in the comfort zone. If an object is then recognized, the reduction of the glare region in the case of residence probabilities below a threshold value, such as a safety zone threshold value, can be effected in such a way that the object is situated at least in the safe zone. Advantageously, the reduction can also be effected in such a way that the object is situated in the comfort zone. This can in particular also be done depending on a second threshold value, such as a comfort zone threshold value.

For strategic reasons it is advantageous if in the case of an unsafe distance determination for the object, the glare region of the headlight is reduced in such a way that all objects are situated at least in a safe zone.

According to the invention, the light intensity can be reduced in a region having increased brightness compared with the surrounding distribution.

Moreover, the reduction of the light intensity is achieved by reducing or switching off superimposing light sources or light distributions which are used for generating a matrix high beam and/or which lie in the region in which additional spotlights are superimposed on the matrix high beam and/or lie in a region centrally with respect to the matrix high beam.

Figure 9:
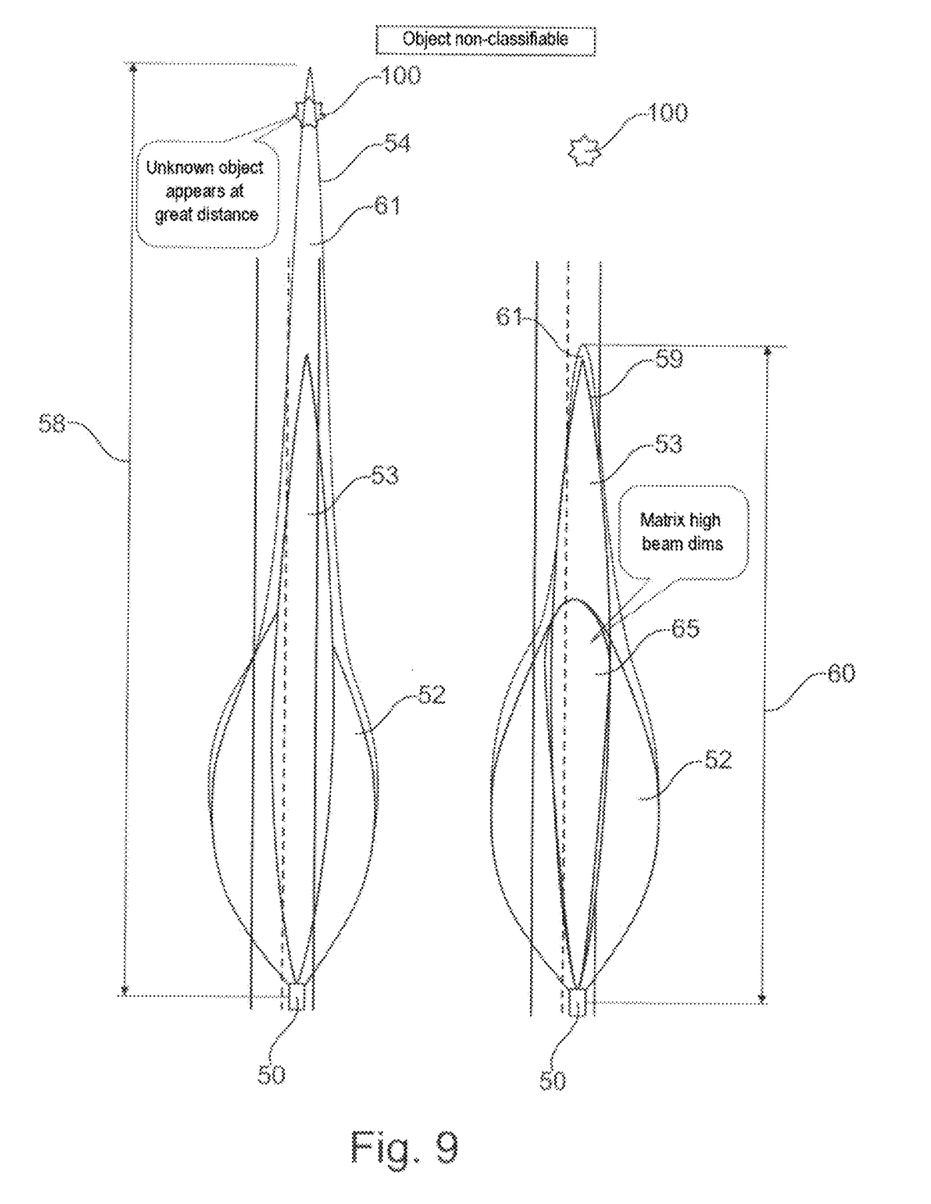
FIG. 9 shows a schematic illustration for elucidating suppression of glare in the case of a non-classifiable object.
Figure 10:
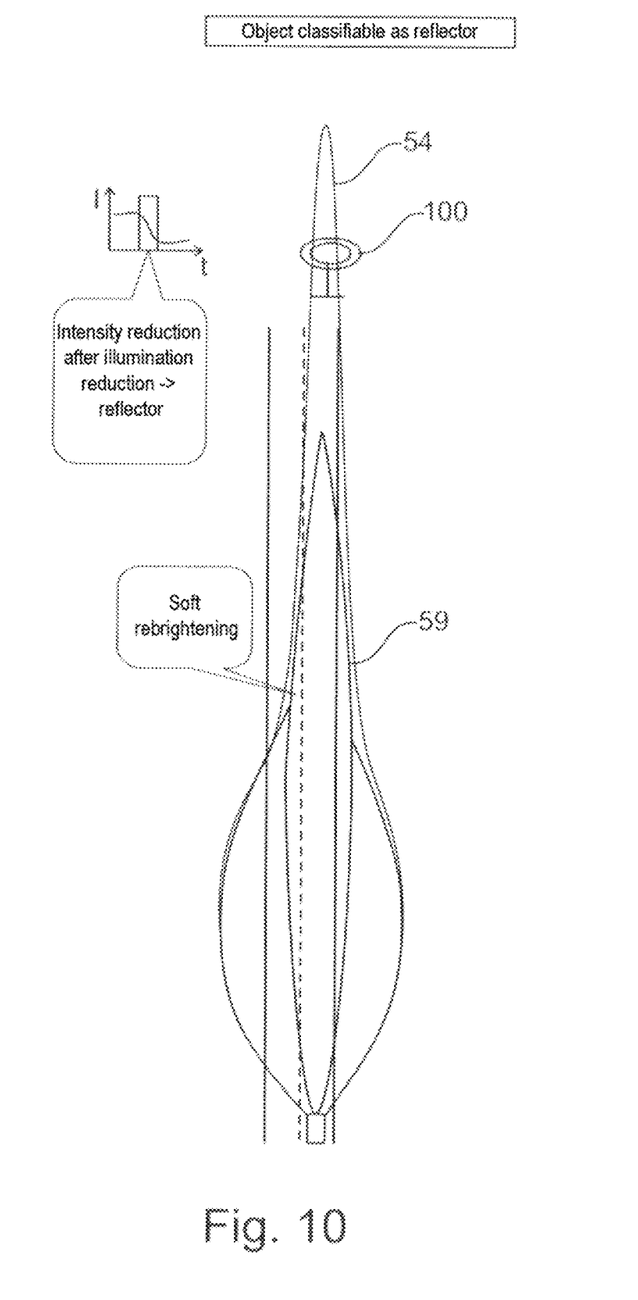
FIG. 10 shows a schematic illustration for elucidating suppression of glare in the case of an object classified as a reflector.
Figure 11:
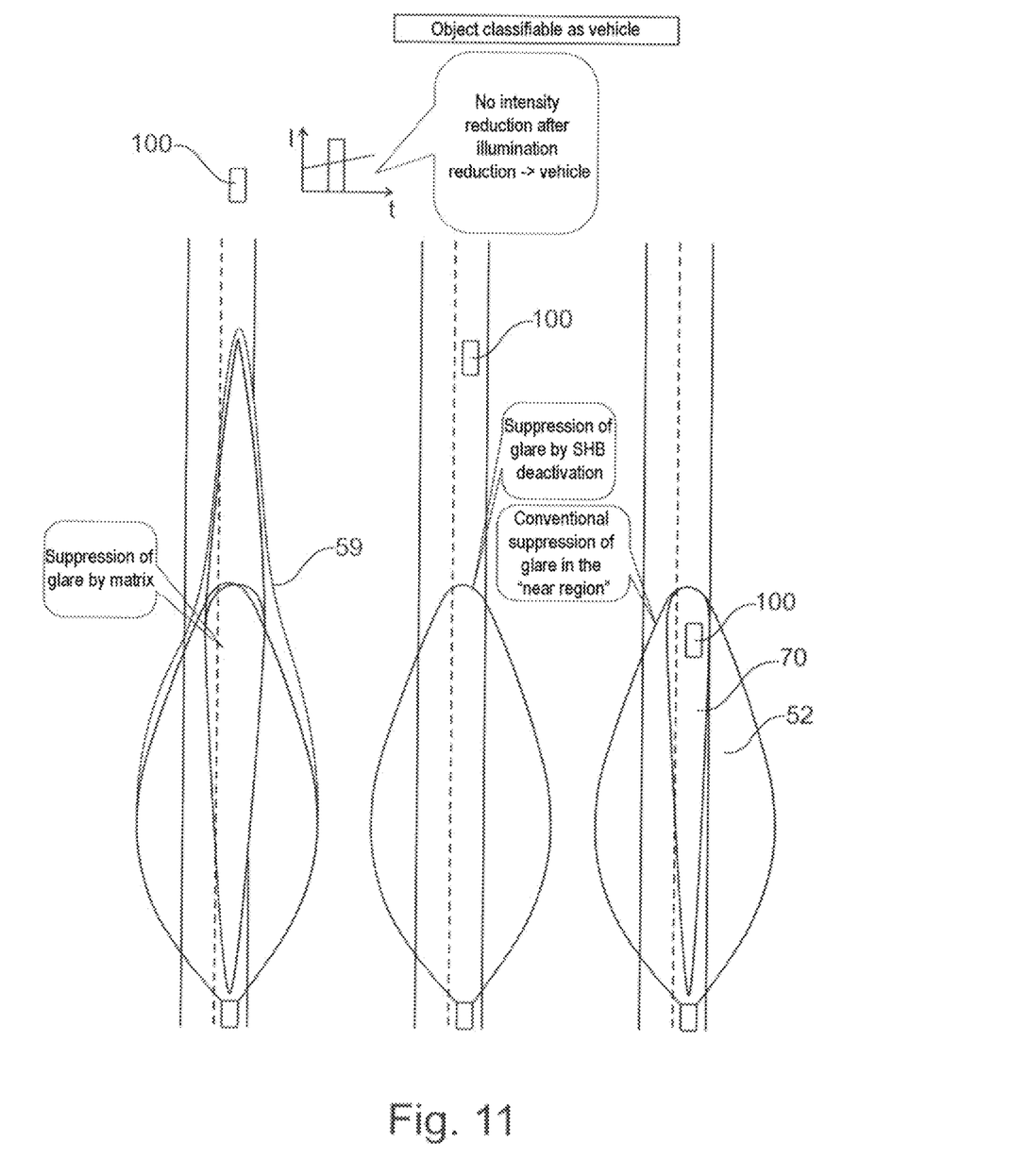
FIG. 11 shows a schematic illustration for elucidating suppression of glare in the case of an object classified as a motor vehicle.

FIGS. 9 to 11 show situations in which a method according to the invention is carried out.

FIG. 9 shows a light distribution in accordance with FIG. 8 in which at a great distance an object 100, such as a non-classified or non-classifiable object 100, appears and enters the glare region of the light distribution 54. Said object is recognized as a luminous object by the monitoring device, see left-hand illustration in FIG. 9. Even if the object was possibly already recognized as a luminous object by the monitoring device before entering the glare region, nevertheless it was not able to be recognized as a road user with sufficient certainty within a predefined time period. As a result, it is not ensured that the object is identifiable as a road user by the time it enters the glare region. It can therefore be assumed that the object is possibly a road user situated outside the monitoring region of the camera but already within the glare region of the headlight. The low-beam is subsequently reduced in terms of its range or glare distance, such that the resulting light distribution 59 has a reduced glare distance 60. Optionally, before the dimming, a residence probability can be determined in an intermediate step on the basis of the classification result. The determination of the residence probability reveals, for example, that there is a 50% probability of the object being a motor vehicle which, under the assumption that it is a motor vehicle, is situated in the glare region of the headlight with a probability of 70%. Both values lie above the threshold values of for example 40% and 50%, respectively. Alternatively, it is possible to determine a conditional probability and to compare it with only one threshold value. Possibly, the value of the most probable distance of the potential motor vehicle is furthermore determined.

The reduction of the glare distance here advantageously involves reducing the light distribution 52 of the matrix high beam in the region 65 superimposed by the light distribution of the spot region of a high-intensity beam 53, such as a laser beam, in particular. In this case, the glare distance 58 is reduced to a glare distance 60 of the resulting cumulative light distribution 59 depending on the degree of the reduction of the intensity of the matrix high beam. The total light distribution is designated by 61. The glare region 60 can therefore be reduced relative to the glare region 58 to any distance, down to the range of the light distribution of the high-intensity beam 53, such as a laser beam, depending on what and whether an intensity of the adapted light distribution of the matrix high beam is still superimposed with the light distribution 53. It is particularly advantageous here if the matrix headlight reduces the region superimposed by the high-intensity beam, such as the laser beam, continuously or in a stepwise manner in order that the reduction is not perceived as disturbing by the driver. Furthermore, it is advantageous if the intensity of the matrix high beam is reduced in such a way that the new glare region is no longer outside the monitoring region. Alternatively, it is advantageous if the matrix high beam is reduced depending on the latitude of the residence probability and/or depending on the most probable distance of the potential motor vehicle. Furthermore, it is advantageous if the glare distance of the laser spot does not lie outside the monitoring range. Since the motor vehicle 50 is travelling, the object 100, that is to say the potential motor vehicle, is coming relatively closer.

FIG. 10 shows a light distribution 59 in accordance with FIG. 9, right-hand illustration. In the case of a reduction of the illumination of the headlight, a reduction of the light intensity of the object 100 is recognized, which indicates a reflector as object 100. As a result of this observation, the object 100, although it is situated outside the monitoring region of the monitoring unit, can then be identified with high certainty as an object for which glare does not have to be suppressed. It can therefore be illuminated maximally again. A rebrightening and thus a reducing of the reduction is the consequence. This can be effected in particular by a stepwise or continuous increase in the intensity of the light distribution of the matrix light in the region of the laser beam, such that the rebrightening is not perceived as disturbing by the driver. If the object 100 is already identified as an object for which glare does not have to be suppressed with high certainty during the reduction of the headlight, then it is advantageous to interrupt said reduction and directly to begin the rebrightening. In this case, it is furthermore advantageous only to effect brightening if further luminous objects within the maximum glare region are no longer recognized or supposed. Advantageously, therefore, brightening should be effected only if no (further) objects are present with a residence probability greater than a predefined threshold value. If this is ensured, the light distribution 54 in accordance with FIG. 8 is subsequently generated again.

FIG. 11, left-hand illustration, shows a light distribution 59 in accordance with FIG. 9, right-hand illustration. Upon a reduction of the illumination of the headlight, in this case no reduction of the light intensity of the object 100 is recognized, which indicates a self-luminous object 100, that is to say for example an oncoming motor vehicle as object 100. As a result of this observation, the object 100, although it is situated outside the monitoring region of the monitoring unit, can then be identified with high certainty as an object for which glare is to be suppressed. The reduction of the glare distance is therefore maintained. The object is coming relatively closer, as shown in the middle and right-hand illustrations in FIG. 11. In FIG. 11, left, the suppression of glare is effected if possible by the further suppression of glare of the high beam in accordance with the object distance. As the object comes nearer, such that it enters the glare distance of the high-intensity beam, the reduction of the matrix high beam in the region superimposed by the laser spot no longer suffices for suppression of glare. Therefore, the suppression of glare for the object is effected by the suppression of glare of the high-intensity beam and by deactivation of the high-intensity beam (laser spot) with simultaneous reactivation of the matrix high beam in the superimposed region, see FIG. 11, middle. As the object comes ever closer still, the suppression of glare for the object is effected with a deactivated high-intensity beam and by conventional (renewed) suppression of glare of the high beam in the near region. The high beam is cropped in terms of its light distribution by darkening 70 of an areal or spatial region, advantageously of the spatial region in which the motor vehicle is situated.

In this case an object is deemed to be non-classifiable if the classification method yields no result or yields no result with sufficient quality or yields no result in a predefined time period or the classification method yields no result by the time a predefined distance of the object is undershot, in particular without—on account of a driving of the headlight—an extended classification being made possible on the basis of the observation of the effects of the headlight driving on the object, or if a method for preclassification yields no result or yields no result with sufficiently good quality.

LIST OF REFERENCE SIGNS

1 First light distribution
2 Second light distribution
3 Glare distance
4 Motor vehicle
5 Glare distance
6 Road user not yet subjected to glare
7 Road user or luminous object
8 Traffic signs or luminous object
9 Monitoring region
10 Light distribution
11 Light distribution
12 Intensity extension
20 Glare region
50 Motor vehicle
51 Low-beam light distribution
52 High-beam light distribution
53 High-intensity beam
54 Light distribution
55 Glare distance
56 Glare distance
57 Glare distance
58 Glare distance
59 Light distribution
60 Glare distance
61 Total light distribution
65 Superimposed region
70 Darkening
100 Object

The invention claimed is:

1. A method for controlling a light distribution of at least one headlight comprising one illuminant or comprising a plurality of illuminants which generates or generate an adaptable light distribution, the method comprising:
   providing an optical monitoring device having a monitoring region, wherein a luminous object is identifiable as a road user only within the monitoring region,
   recognizing or suspecting based on data of the optical monitoring device at least one luminous object,
   calculating a specific probability of the luminous object, and when it is determined that a certain object type is present with a specific probability, estimating a distance to the object and a residence probability, and
   driving at least one headlight on the basis of the residence probability of the luminous object.

2. The method according to claim 1,
wherein the at least one headlight is driven in such a way that a luminous distance or a glare distance is reduced by a light intensity of selected illuminants being reduced.

3. The method according to claim 1,
wherein the residence probability of the luminous object is composed of a probability of the luminous object being an object at risk of glare and/or a probability of the object at risk of glare being situated in a glare region of the headlight and/or a probability of an object being present.

4. The method according to claim 2,
wherein the light intensity is reduced in a predefined areal or spatial region, such that the luminous distance or the glare distance is reduced in a predefined areal or spatial region.

* * * * *